United States Patent
Coussot

[11] 4,084,885
[45] Apr. 18, 1978

[54] MICROSCOPE OBJECTIVE

[75] Inventor: Pierre Coussot, Paris, France

[73] Assignee: Societe d'Optique, Precision Electronique et Mecanique - SOPELEM, Paris, France

[21] Appl. No.: 680,279

[22] Filed: Apr. 26, 1976

Related U.S. Application Data

[63] Continuation-in-part of Ser. No. 527,155, Nov. 25, 1974, abandoned.

[30] Foreign Application Priority Data

Nov. 27, 1973 France .................. 73 42190
Oct. 28, 1974 France .................. 74 35933

[51] Int. Cl.² .......................... G02B 21/02; G02B 11/30
[52] U.S. Cl. .......................... 350/175 ML; 350/216
[58] Field of Search ................ 350/216, 175 MO

[56] References Cited

U.S. PATENT DOCUMENTS

3,437,398  4/1969  Muller et al. ............... 350/175 MO
3,481,665  12/1969  Rosenberger ............... 350/175 MO

*Primary Examiner*—Conrad J. Clark
*Attorney, Agent, or Firm*—Cameron, Kerkam, Sutton, Stowell & Stowell

[57] ABSTRACT

An objective for a microscope has a meniscus lens of positive power at one end of the objective. A lens of negative power is located at the other extremity of the objective. Three intermediate doublets of positive power are located between the first two lenses each formed of a convergent lens cemented to a divergent lens. The meniscus lens situated at the front has focal length between 1.5f and 2.5f. The lens of negative power is a doublet formed of a convergent lens and a divergent lens with a focal length between $-8f$ and $-15f$. The first doublet located close to the lens of negative power has a focal length between 14f and 18f. The second doublet situated immediately before the first doublet has a focal length between 6f and 8f. The third doublet located between the second doublet and the meniscus lens at the front end of the objective has a focal length between 3f and 4f.

2 Claims, 9 Drawing Figures

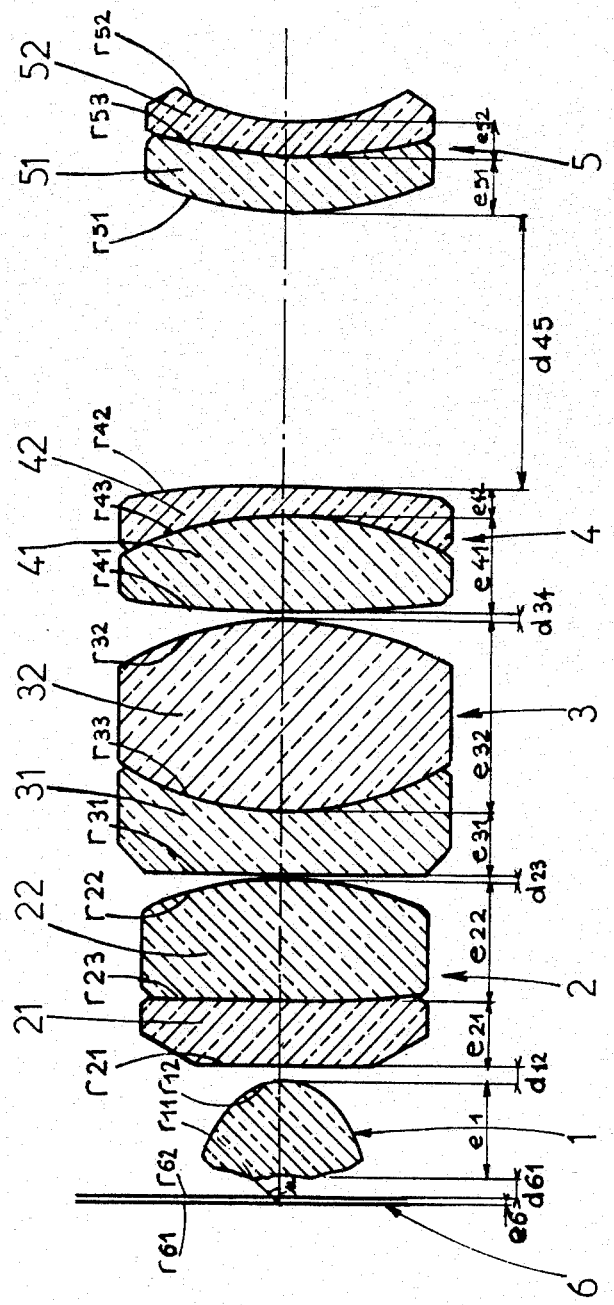
FIG:1

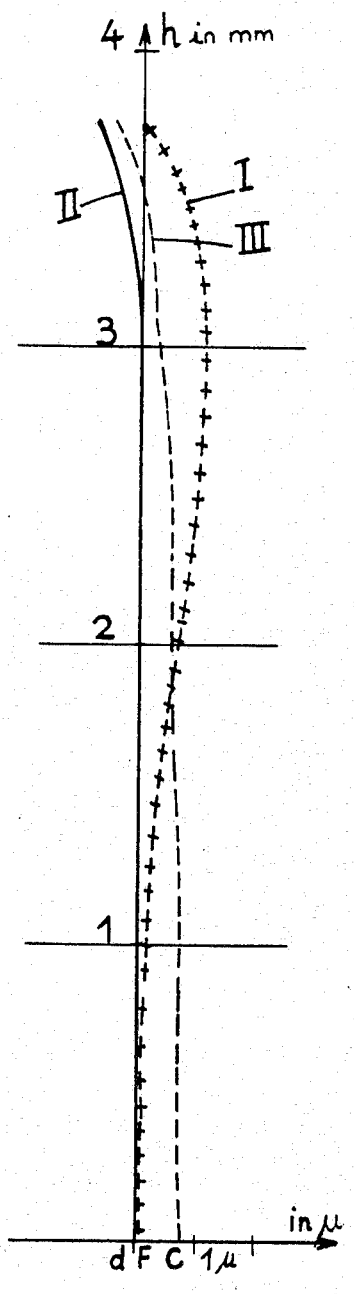
FIG:2
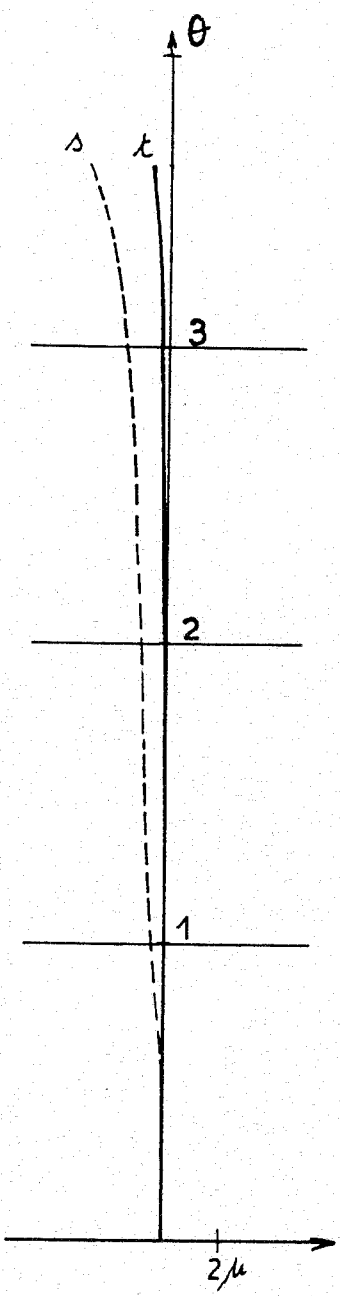
FIG:3

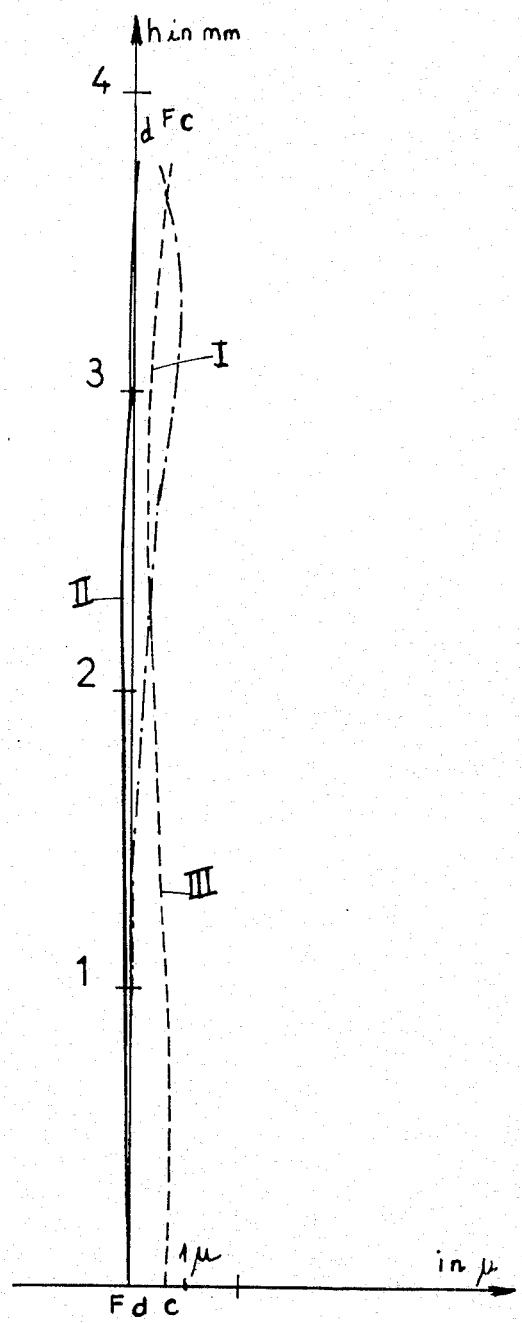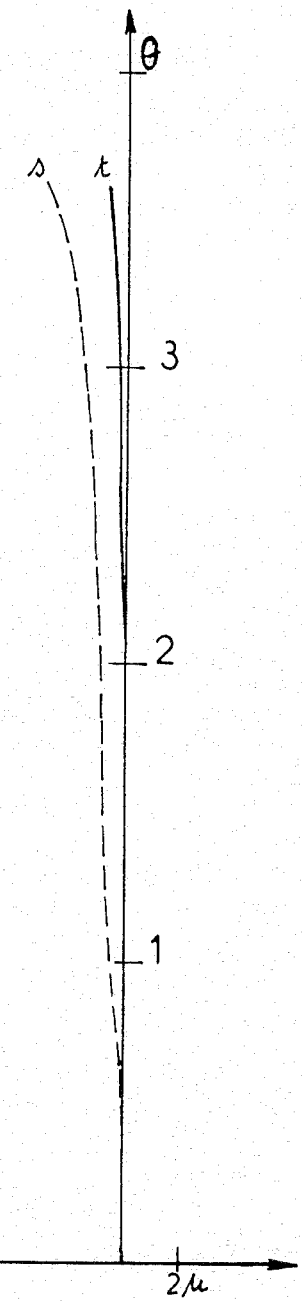

MICROSCOPE OBJECTIVE

This is a continuation-in-part of Ser. No. 527,155 filed Nov. 25, 1974, and now abandoned.

BACKGROUND OF THE INVENTION

The present invention relates to a "dry" objective for a microscope, the object being separated from the objective by a layer of air.

The objective of the present invention gives an image of infinity and is used with a microscope provided with a convergent lens to form an image in the focal plane of the ocular. The objective need not be positioned precisely.

The objective of the present invention is used with a microscope for the examination of transparencies or with a metalographic microscope.

In a microscope the limit of resolution varies in accordance with $1/n \sin u$, $n$ being the index of refraction of the medium separating the object from the objective (air in the case of a "dry" objective, and then being almost equal to 1), $u$ being the angular half opening of the objective seen from the object. The objectives of a microscope are characterized by a number, called the numerical opening, which is equal to $n \sin u$, more particularly to $\sin u$ for a "dry" objective. The aberrations, that is, the defects altering the quality of the formed images, increase if it is desired to increase the numerical opening to increase the power of resolution. A microscope objective having a large numerical opening should be corrected for various aberrations.

A microscope objective should thus be corrected for chromatic aberration. It is known that the index of refraction for refringent materials, usually making up the lenses of the objective, varies with the wave length. If the object point is a source of white light (super-position of an infinity of monochromatic radiations), the objective gives an infinity of monochromatic images distributed along the axis. It is known that a simple convergent and divergent system provides inverse distributions of the monochromatic images. The chromatic aberrations can be corrected by suitable choice of the glasses of the lenses.

An optical glass is characterized by the parameter $\gamma = n_d - 1/n_F - n_c$, known as the dispersive power of Abbe number, $n_F$ and $n_c$ corresponding to the indices of refraction measured for the rays C and F (red and blue) of hydrogen, $nd$ corresponding to the index measured for the ray $d$ of helium, the wave length of which is intermediate between those of rays C and F. The average index $nd$ corresponds to that of the glass. The partial dispersion is then defined as $\gamma p - n_d - n_c/n_F - n_c$.

A convergent lens is characterized by a certain distance between the images obtained for the rays C and F. A divergent lens is characterized by a certain distance between the images obtained for the same rays C and F. When chromatism is corrected, the images corresponding to the rays C and F are made to coincide by associating a divergent lens and a convergent lens for which the glasses are suitably chosen. When the correction is obtained, the images obtained for the rays C and F being substantially superposed, the images obtained for the other radiations (ray $d$, for example) remain separated from the proceeding images. This is spoken of as secondary chromatism. An objective corrected for secondary chromatism is called apochromatic. To reduce secondary chromatism of a doublet formed of a convergent lens cemented to a divergent lens, it is necessary that the partial dispersion $V_p$ of the glasses be substantially equal.

A microscope objective should also be corrected from the point of view of curvature of field. An optical system is said to present the aberration of curvature of field when the point object, describing a plane perpendicular to the axis, the location of the image describes a surface of revolution which is offset from the plane of the ideal image. The curvature of field of an assembly of lenses is measured by the Petzval sum which, in the case of thin lenses, is equal to the sum of the quantities $1/nF$ calculated for the different lenses of the assembly, F representing the focal distance and $n$ representing the index of refraction of the glass. It is known that the higher the indexes, the closer the Petzval sum moves towards 0 and the smaller the curvature of the field and inversely. Further, a lens of negative power (a divergent lens) has a Petzval sum which is negative which decreases the total value of the Petzval sum.

An objective of a microscope should also be corrected from the point of view of spherical aberration. This purely geometrical aberration which is produced in monochromatic light, occurs by reason of the fact that the marginal rays are more deviated by a simple convergent system than the central rays, a divergent system giving an aberration in opposite sense.

A microscope objective should be more generally corrected from the point of view of stigmatism, which condition occurs when all rays issuing from a point object pass through the point image.

An apochromatic microscopic objective has already been realized, that is, having a reduced secondary chromatism. This result has been obtained usually by the use of fluorspar crystals, of low dispersion, to construct certain elements of the objective. This type of objective has the inconvenience of being relatively burdensome.

Microscope objectives corrected from the point of view of curvature of field are known. An objective of this type is described in French Pat. No. 1,310,259.

The present invention has for its object to provide a microscope objective having focal lengths between 2.5 and 8mm. It has a large numeric opening on the order of 0.75. The objective is provided with a plane field, the Petzval sum being small with respect to that of an objective of equivalent focal length. The objective has a reduced secondary chromatism and is perfectly corrected from the point of view of spherical aberration, coma, and astigmatism. The distance between the object and the first element of the objective is large. In an embodiment of the objective the use of fluorspar for predetermined lenses provides a particularly accurate correction for secondary chromatism.

SUMMARY OF THE INVENTION

In accordance with the present invention the objective, of focal power $f$, comprises a lens of positive power located at the front extremity of the objective close to the object having a meniscus form having its concave face directed toward the object. A lens of negative power is situated at the rear extremity of the objective having its convex surface directed toward the object. Three intermediate doublets of positive power are each formed of a convergent lens cemented to a divergent lens and is essentially characterized by the fact that the meniscus lens situated at the front has a focal length between 1.5F and 2.5F. The lens of negative power is a doublet formed of a convergent lens cemented to a divergent lens the indices of which are quite similar and for which the partial dispersions are quite different, the focal length of the doublet being between 0.8f and 0.15f. The first doublet, situated close to the lens of negative power is formed of glasses of very different indices, has a focal length between 14f and 18f, is located at a distance between 1.5f and 2.5f from the lens of negative power. The second doublet situated immediately in front of the first doublet is formed of glasses having very different indices, the partial dispersions are almost identical, and has a focal length between 6f and 8f, and is situated at a distance between 0 and 0.1f from the first doublet. The third doublet situated between the second doublet and the meniscus lens situated at the front extremity is formed of glasses having high indices, a focal length between 3f and 5f and is situated at a distance between 0 and 0.1f from the second doublet and at a distance between 0 and 0.2f from the mensicus lens.

BRIEF DESCRIPTION OF THE DRAWINGS

The invention will now be described in more detail with respect to preferred embodiments thereof and will refer to the accompanying drawings in which FIG. 1 is an objective of a "dry" microscope in accordance with the present invention.

FIGS. 2, 3, 4a and 4b are curves qualifying the aberrations both geometric and chromatic of an embodiment of the objective of the present invention as defined in Table I.

FIGS. 5, 6, 7a and 7b are curves qualifying the aberrations both geometric and chromatic of an embodiment of the objective in accordance with the present invention as defined and described in Table II.

Figure 4A:
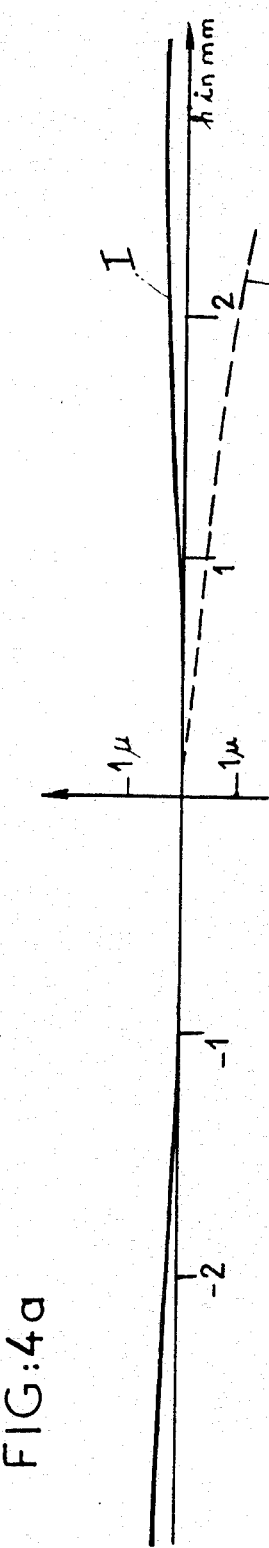

The objective as seen in FIG. 1 comprises in the direction object to infinity five optical elements 1, 2, 3, 4 and 5.

Optical element 1 is located at the front end of the objective and is close to the object, has a positive power, and a focal length $f_1$ being between 1.5f and 2.5f. Lens 1 has a higher power than the other elements, as is well-known. This meniscus is provided with a concave face of radius $r_{11}$ directed toward the object. This is favorable to correction for spherical aberration. The index and the dispersion of the glass which makes up lens 1 are chosen so as to introduce a minimum of curvature of field and to facilitate correction of secondary chromatism.

Element 5 located at the extreme rear of the objective is a doublet of negative power formed of a divergent lens 52 and a convergent lens 51 whose indexes of refraction are very similar but for which the partial dispersions are very different. The focal length $f_5$ of this element is between $-8f$ and $-15f$.

The intermediate element 4, situated close to element 3, is a doublet of positive power formed of a divergent lens 42 cemented to a convergent lens 41. Convergent lens 41 is situated on the side of the object, divergent lens 42 is directed toward element 5. The focal length $f_4$ is between 14f and 18f. The interval $d_{45}$ between element 4 and element 5 is defined by the relation: $1.5f < d_{45} < 2.5f$. The indices of the glasses of divergent lens 42 and of convergent lens 41 are quite different which favors correction of spherical aberrations.

The second intermediate element 3, situated immediately in front of the intermediate element 4, is a doublet of positive power formed by a convergent lens 32 and a divergent lens 31 cemented together. The indices of the glasses making up the two lenses are very different. The partial dispersions of the glasses are almost identical which gives the doublet a reduced secondary chromatism (the images for the rays C, d, F are almost superposed). The focal length $f_3$ of element 3 is between 6f and 8f. The interval $d_{34}$ between element 3 and element 4 is limited by the relation $0 < d_{34} < 0.1f$. In this element, contrary to element 4, the convergent lens is located toward the rear element 5 while divergent lens 31 is situated on the side of the object.

The third intermediate element 2, situated close to the meniscus lens 1, is a doublet of positive power formed by a convergent lens 22 and a divergent lens 21. The indices of these lenses are greater than 1.7 which provides good correction for curvature of field. The focal length $f_2$ of this doublet is between 3f and 4f. The interval $d_{23}$ between element 2 and element 3 is defined by the relation $0 < d_{23} < 0.1f$. The distance $d_{12}$ between meniscus lens 1 and element 2 is defined by the relation $0 < d_{12} < 0.2f$.

Tables I, II, and III give, by way of example, characteristics of embodiments of the objective in accordance with the present invention. Each table gives for each lens of the objective the radii of curvature, thickness, mean or average index of refraction, dispersion power $\gamma$, partial dispersions $\gamma p$, and further gives the intervals or separations of air between the elements. Correction of this objective is effected for an object covering plate 6 whose characteristics are given in the table. The optical convention used is that all the concave surfaces facing the incident light have positive radii and that all the convex surfaces facing the incident light have negative radii.

Table I gives the characteristics for an objective providing a magnification of 40 times, a focal length $f$ of 5mm and an opening $\sin u = 0.75$.

FIGS. 2, 3, 4a and 4b are curves qualifying the geometric and chromatic aberrations of the preceeding objective.

On the graph of FIG. 2, the ordinate $h$ represents the height with respect to the optical axis of an incident ray parallel to the optical axis, the field being then zero and the object situated at infinity. The graph also shows curves I, II, III corresponding to rays of the radiations F(0.4861A), d(0.5876A) and C(0.6563A). The points d, F, C on the abscissa represent the positions of the monochromatic images of the rays, d, F, C on the optical axis (axial chromatism). It can then be determined by taking as the point of orgin d or F or C the distance between the focal point of origin d or F or C the distance between the focal point of a ray of the corresponding radiation at the height $h$ and the focal point of a ray of the paraxial domain of the same radiation, this distance representing what is called spherical aberration.

FIG. 3 gives for ray d, as a function of the angle of field $\theta$ in degrees the distances in microns between the focal plane and the tangential focal t and the saggital focal s. The separation of the curves s and t illustrates the phenomena of astigmatism. The curves s and t which are removed from the focal plane illustrate further the phenomena of curvature of field.

FIG. 4a defines in the abscissa the height $h$ of the incident beam of monochromatic light (ray d) on the first diopter measured with respect to the average ray for a half field of 3° 60′. The ordinate defines the meridian diffusion (curve I), that is, the line following the meridian plane of the beam emerging on the focal plane measured with respect to the line of the average ray, and further shows the extrameridian diffusion curve III, that is, the line of the beam following the extrameridian plane.

Figure 4B:
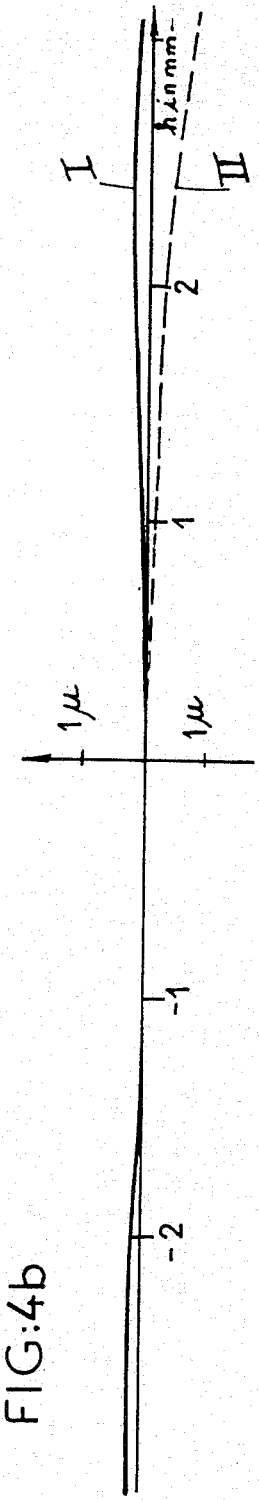

FIG. 4b gives at I the curve for meridian diffusion and at II the curve of extra-meridian diffusion for a half field of 2°.

Table II gives the characteristics of an objective providing magnification of 40 times, with a focal length $f$ of 5mm and an opening $\sin u = 0.75$. Convergent lens 41 is made of fluorspar.

FIGS. 5, 6, 7a and 7b give the curves showing the geometric and chromatic aberrations of the objective defined by Table II.

In the graph of FIG. 5 the ordinate $h$ represents the height with respect to the optical axis of an incident ray parallel to the optical axis, the field being then zero and the object situated at infinity. The graph also shows the curves I, II, III corresponding to the rays of radiation F(0.4861A), d(0.5876A) and C(0.6563A). The points $d$, F, C on the abscissa represent the positions of monochromatic images for the radiations $d$, F, C, on the optical axis (axial chromatism). It can then be determined by taking as the point of origin $d$ or F or C the distance between the point of focalization of a ray of a corresponding radiation at the height $h$ and the point of focalization of a ray of the paraxial domain of the same radiation, the distance representing the spherical aberration.

FIG. 6 gives for ray $d$, as a function of the angle of field $\theta$ in degrees, the distances in microns between the focal plane and the tangential focal $t$ and the saggital focal $s$.

Figures 7A, 7B:
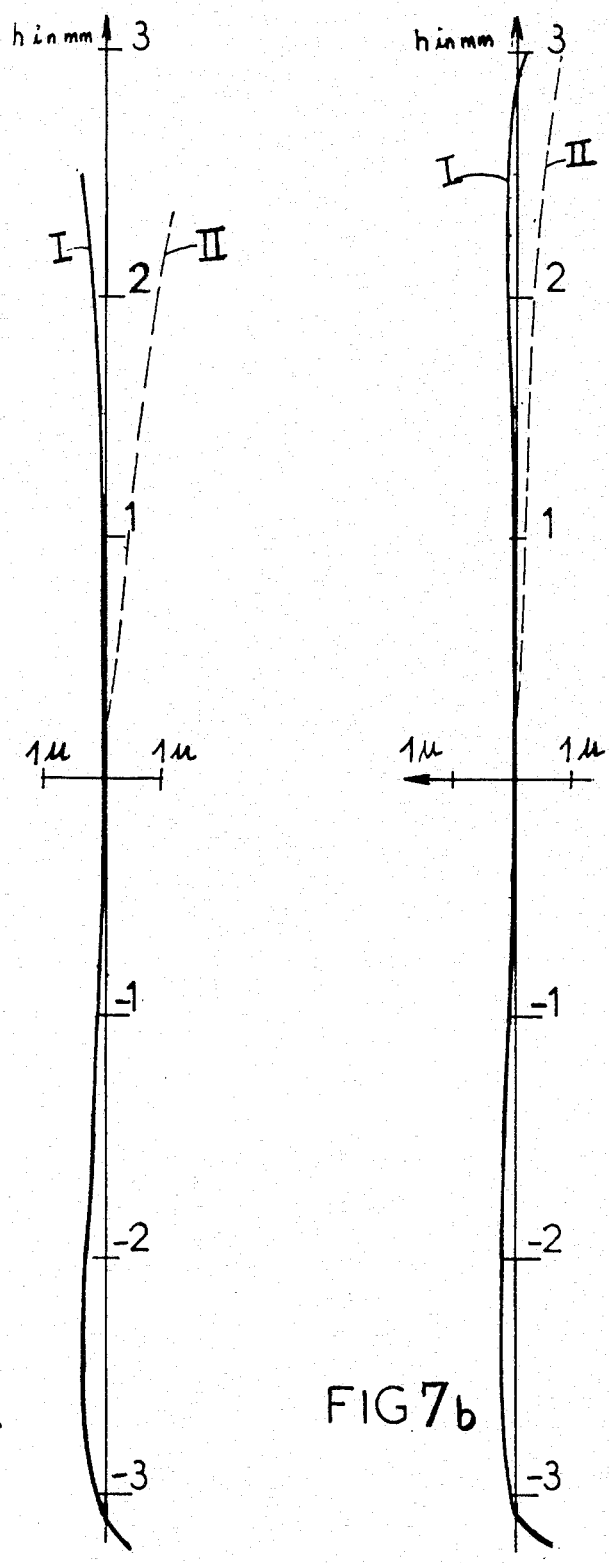

FIG. 7a defines in the abscissa the height $h$ of a monochromatic incident beam of light (ray $d$) on the first diopter measured with respect to the average ray for a half field of 2° 867'. The ordinate defines the meridian diffusion (curve I), that is, the trace following the meridian plane, of the emerging beam on the focal plane, measured with respect to the trace of the average ray, and shows also the extra-meridian diffusion curve II, that is, the trace of the beam following the extra-meridian plane.

FIG. 7b gives at I the curve of meridian diffusion and at II the curve of extra-meridian diffusion for a half field of 2°.

Table III gives the characteristics of an objective for a microscope in accordance with the present invention having a focal length $f$ of 3.175mm and a numeric opening of 0.8 providing a magnification of 63 times.

TABLE I

| Element or Interval | Lens | Radii of curvature in mm | Thickness of Lens in mm | Index of refraction $\eta$ | Focal Lenght | Interval | Power of dispersion $\nu$ | Partial Dispersion $\nu p$ |
|---|---|---|---|---|---|---|---|---|
| Plate 6 | | $r_{61} = \infty$ $r_{62} = \infty$ | $e_6 = 0.17$ | 1.5265 | | | | |
| Interval $d_{61}$ | | | | | | 0.70 mm | | |
| Element 1 | | $r_{11} = +3.18$ $r_{12} = +2.611$ | $e_1 = 3$ | 1.58894 | +8.387mm = +1.67f | | 60.6 | 0.3002 |
| Interval $d_{12}$ | | | | | | 0.6mm = 0.12f | | |
| Element 2 | 21 | $r_{21} = +200.2$ $r_{23} = -82.28$ | $e_{21} = 2$ | 1.8051 | +18.394mm +3.67f | | −25.5 | 0.288 |
| | 22 | $r_{22} = +12.57$ | $e_{22} = 4$ | 1.73335 | | | −51.4 | 0.300 |
| Interval $d_{23}$ | | | | | | 0.22mm = 0.04f | | |
| Element 3 | 31 | $r_{31} = -247.5$ $r_{33} = -10.66$ | $e_{31} = 2$ | 1.69650 | +32.884mm = +6.56f | | 36.4 | 0.2970 |
| | 32 | $r_{32} = +10.75$ | $e_{32} = 6.2$ | 1.48043 | | | 81.0 | 0.3018 |
| Interval $d_{34}$ | | | | | | 0.2mm = 0.04f | | |
| Element 4 | 41 | $r_{41} = -42.52$ $r_{43} = +13.98$ | $e_{41} = 3$ | 1.48043 | +83.622mm = 16.69f | | 81.0 | 0.3018 |
| | 42 | $r_{42} = +38.54$ | $e_{42} = 1$ | 1.7408 | | | 28.1 | 0.289 |
| Interval $d_{45}$ | | | | | | 9.8mm = 1.96F | | |
| Element 5 | 51 | $r_{51} = -11.86$ $r_{53} = -25$ | $e_{51} = 2$ | 1.58406 | −71.481mm = −14.266f | | 37.0 | 0.2928 |
| | 52 | $r_{52} = -8.41$ | $e_{52} = 1$ | 1.58784 | | | 68.2 | 0.3081 |

TABLE II

| Element or Interval | Lens | Radii of curvature in mm | Thickness of Lens in mm | Index of refraction $\eta$ | Focal Length | Interval | Power of dispersion $\nu$ | Partial Dispersion $\nu p$ |
|---|---|---|---|---|---|---|---|---|
| Plate 6 | | $r_{61} = \infty$ $r_{62} = \infty$ | $e_6 = 0.17$ | 1.52278 | | | | |
| Interval $d_{61}$ | | | | | | 0.40mm | | |
| Element 1 | | $r_{11} = +2.999$ $r_{12} = +2.668$ | $e_1 = 3.00$ | 1.61484 | +8.833mm = 1.77f | | 51.1 | 0.3000 |
| Interval $d_{12}$ | | | | | | 0.56mm = 0.11f | | |
| Element 2 | 21 | $r_{21} = +110.700$ $r_{23} = -33.982$ | $e_{21} = 2.00$ | 1.8046 | +18.580mm | | −25.5 | 0.288 |

TABLE II-continued

| Element or Interval | Lens | Radii of curvature in mm | Thickness of Lens in mm | Index of refraction $\eta$ | Focal Length | Interval | Power of dispersion $\nu$ | Partial Dispersion $\nu p$ |
|---|---|---|---|---|---|---|---|---|
| | 22 | $r_{22} = +11.955$ | $e_{22} = 4.00$ | 1.7337 | $= +3.7f$ | | $-51.1$ | 0.300 |
| Interval $d_{23}$ | | | | | | 0.20mm $= 0.04f$ | | |
| Element 3 | 31 | $r_{31} = -71.433$ $r_{33} = -10.897$ | $e_{31} = 2.00$ | 1.69632 | $+33.799$mm $= +6.77f$ | | 36.4 | 0.2970 |
| | 32 | $r_{32} = +10.431$ | $e_{32} = 6.20$ | 1.43388 | | | 95.4 | 0.2989 |
| Interval $d_{34}$ | | | | | | 0.20mm $= 0.04f$ | | |
| Element 4 | 41 | $r_{41} = -37.250$ $r_{43} = +16.807$ | $e_{41} = 3.00$ | 1.43388 | $+88.134$mm $= +17.65f$ | | 95.4 | 0.2989 |
| | 42 | $r_{42} = +41.400$ | $e_{42} = 1.00$ | 1.74098 | | | 28.1 | 0.289 |
| Interval $d_{45}$ | | | | | | 9.80mm $= 1.96f$ | | |
| Element 5 | 51 | $r_{51} = -11.196$ $r_{53} = -43.550$ | $e_{51} = 2.00$ | 1.54765 | $-74.180$mm $= -14.36f$ | | 42.2 | 0.2952 |
| | 52 | $r_{52} = -8.000$ | $e_{52} = 1.00$ | 1.55232 | | | 63.4 | 0.3069 |

TABLE III $f = 3.175$mm

| Element or Interval | Lens | Radii of curvature in mm | Thickness of Lens in mm | Index of refraction $\eta$ | Focal Lenght | Interval | Power of dispersion $\nu$ | Partial Dispersion $\nu p$ |
|---|---|---|---|---|---|---|---|---|
| Plate 6 | | $r_{61} = \infty$ $r_{62} = \infty$ | $e_6 = 0.17$ | 1.526 | | | | |
| Interval $d_{61}$ | | | | | | 0.3mm | | |
| Element 1 | | $r_{11} = +2.453$ $r_{12} = +1.946$ | $e_1 = 1.9$ | 1.58894 | $+6.691$mm $= +2.11f$ | | 60.6 | 0.3002 |
| Interval $d_{12}$ | | | | | | 0.38mm $= 0.11f$ | | |
| Element 2 | 21 | $r_{21} = +698.9$ $r_{23} = -50.93$ | $e_{21} = 1.3$ | 1.8051 | $+10.901$mm $= +3.43f$ | | 25.5 | 0.288 |
| | 22 | $r_{22} = +7.815$ | $e_{22} = 2.55$ | 1.73350 | | | 51.4 | 0.300 |
| Interval $d_{23}$ | | | | | | 0.13mm $= 0.04f$ | | |
| Element 3 | 31 | $r_{31} = -114.7$ $r_{33} = -7.442$ | $e_{31} = 1.3$ | 1.69650 | $+22.380$mm $= +7.05f$ | | 36.4 | 0.2970 |
| | 32 | $r_{32} = +7.517$ | $e_{32} = 3.95$ | 1.48043 | | | 81.43 | 0.3018 |
| Interval $d_{34}$ | | | | | | 0.13mm $= 0.04f$ | | |
| Element 4 | 41 | $r_{41} = -21.618$ $r_{43} = +8.019$ | $e_{41} = 1.9$ | 1.48043 | $+47.534$mm $= +14.96f$ | | 81.43 | 0.3081 |
| | 42 | $r_{42} = +23.792$ | $e_{42} = 0.65$ | 1.74080 | | | 28.09 | 0.289 |
| Interval $d_{45}$ | | | | | | 6.22mm $= 1.95f$ | | |
| Element 5 | 51 | $r_{51} = -9.587$ $r_{53} = -150$ | $e_{51} = 1.3$ | 1.58406 | $-27.183$mm $= -8.56f$ | | 37.04 | 0.2928 |
| | 52 | $r_{52} = -5.564$ | $e_{52} = 0.65$ | 1.58784 | | | 68.25 | 0.3081 |

What I claim is:

1. An objective for a microscope of focal length f and provided with a lens to form an image in the focal lens of the ocular comprising a lens of positive power located at the front-end of the objective, close to the object, having the form of a meniscus the concave face of which is directed toward the object, a lens of negative power situated at the rear extremity of the objective having a convex surface directed toward the object, three intermediate doublets of positive power formed each of a convergent lens cemented to a divergent lens, the mensicus lens (1) at the front having a focal length between 1.5f and 2.5f the lens of negative power (5) being a doublet formed of a convergent lens (51) cemented to a divergent lens (52) for which the indices are very similar and for which the partial dispersions are quite different, the focal length of said doublet being between −8f and −15f, the first doublet (41-42) situated close to the lens of negative power being formed of glasses of very different indices, having a focal length between 14f and 18f, and is located at a distance of substantially 1.9f from the lens of negative power, the second doublet (31-32) located immediately in front of the first doublet being formed of glasses of very different indices and having almost identical partial dispersions, having a focal length between 6f and 8f, and located at a distance of substantially 0.04f from the first doublet, the third doublet (21-22) situated between the second doublet and the mensicus lens situated at the front end being formed of glass of high indices, having a focal length between 3f and 4f and located at a distance of substantially 0.04f from the second doublet and at a distance between 0 and 0.2f from the meniscus lens.

2. The microscope objective as described in claim 1, the first doublet (4) having a convergent lens (41) facing the object with respect to the divergent lens (42), the second doublet (3) having a divergent lens (31) facing the object with respect to the convergent lens (32).

* * * * *